Jan. 7, 1969 R. MATTICK 3,420,484
CORNER CONSTRUCTION FOR KNOCK-DOWN TABLES
Filed March 6, 1967 Sheet 1 of 5
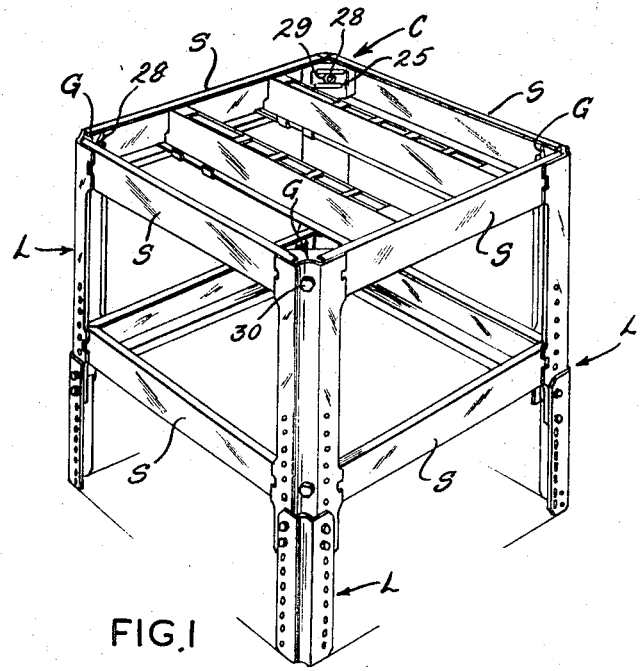
FIG.1
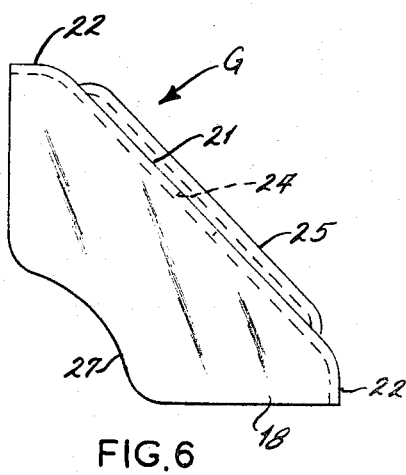
FIG.6
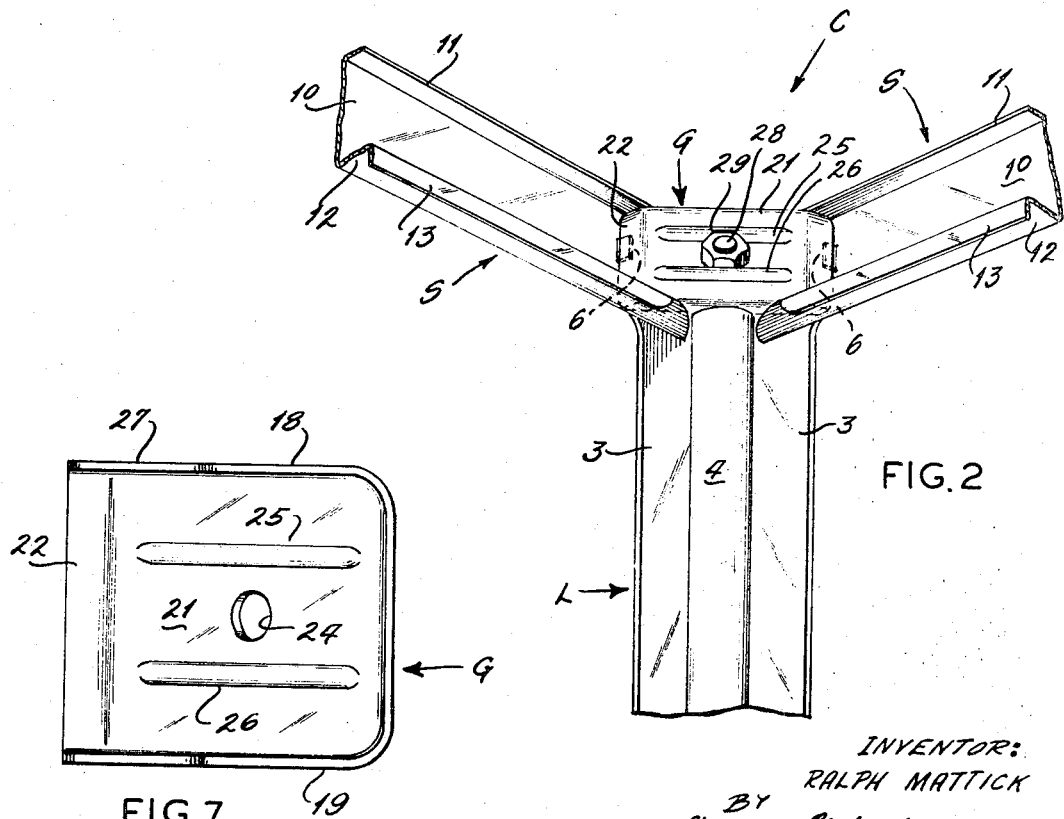
FIG.2
FIG.7
INVENTOR:
RALPH MATTICK
BY
Gravely, Lieder & Woodruff
ATTORNEYS INVENTOR:
RALPH MATTICK
BY Gravely, Lieder & Woodruff
ATTORNEYS.

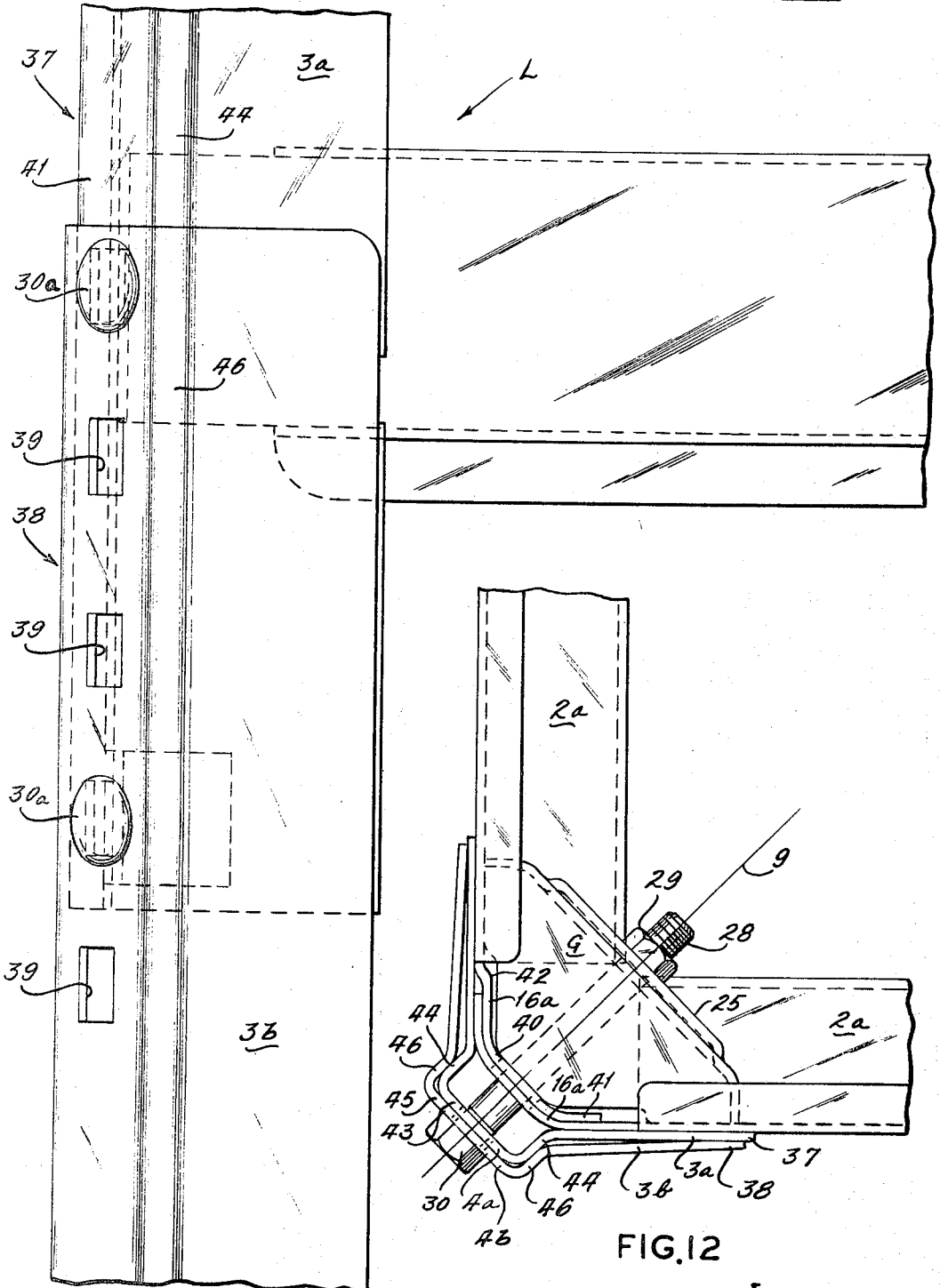

Jan. 7, 1969 R. MATTICK 3,420,484
CORNER CONSTRUCTION FOR KNOCK-DOWN TABLES
Filed March 6, 1967 Sheet 5 of 5

INVENTOR:
RALPH MATTICK
BY Gravely, Lieder & Woodruff
ATTORNEYS.

United States Patent Office 3,420,484
Patented Jan. 7, 1969

3,420,484
CORNER CONSTRUCTION FOR KNOCK-DOWN
TABLES
Ralph Mattick, Frontenac, Mo., assignor to General
Metal Products Company, St. Louis, Mo., a corporation of Missouri
Filed Mar. 6, 1967, Ser. No. 620,765
U.S. Cl. 248—188                                14 Claims
Int. Cl. F16m 11/16

ABSTRACT OF THE DISCLOSURE

A corner construction for a table with an upright leg and two angularly positioned side members, a corner gusset having an oblique wall positioned between said side members, said side members having connectors thereon, a bolt extending through said connectors and said gusset, said leg having tabs thereon extending into an opening in said side members in contact with said gusset to provide a sturdy corner construction.

---

This invention relates to an improved corner construction for knock-down tables, and in particular, to an improved corner requiring only one bolt to provide a sturdy corner construction for a table or tool bench stand.

The invention is embodied in a corner construction which requires only one bolt, instead of several bolts, at each corner to permit the table to be more readily assembled and to provide a steady corner for the table. In the past, heavy duty power tool bench stands have been provided with four legs, four upper horizontal side members, and four lower horizontal side members, so that the four upright legs are supported by side members at their top and near their center portions. Each corner construction requires four bolts to secure two adjacent side members to the leg. Inserting and tightening four bolts proves to be a time consuming and difficult task for the customer, who always receives the table in knocked down form.

One of the principal objects of the present invention is to provide a corner construction which requires only one bolt, instead of four bolts, at each corner and which provides a sturdy corner construction for a table. Such a table may be used to support power tools, such as drill presses, saws, etc., or may be used to support other articles. Another object is to provide a corner having a gusset between adjacent side members which is held in position by inwardly bent tabs from the leg member and secured thereto by a diagonally extending bolt having a nut thereon. The gusset has an oblique wall with ribs for strength and/or for preventing the nut from rotating. Another object is to provide a corner which is more rugged and sturdy than the corner which requires four bolts. Another object is to provide a new construction for vertically adjustable legs. These and other objects and advantages will become apparent hereinafter.

The invention is embodied in a corner construction for a table, said table having leg members with inwardly bent tabs which are received in openings in the side frame members, a corner gusset having two spaced horizontal projections, one above and one below the hole which receives the bolt to prevent the nut thereon from rotating, said corner gusset receiving the tabs in tight contacting relation when the bolt is tightened, said bolt extending through openings in extensions on said side members and said gusset.

Figure 3:
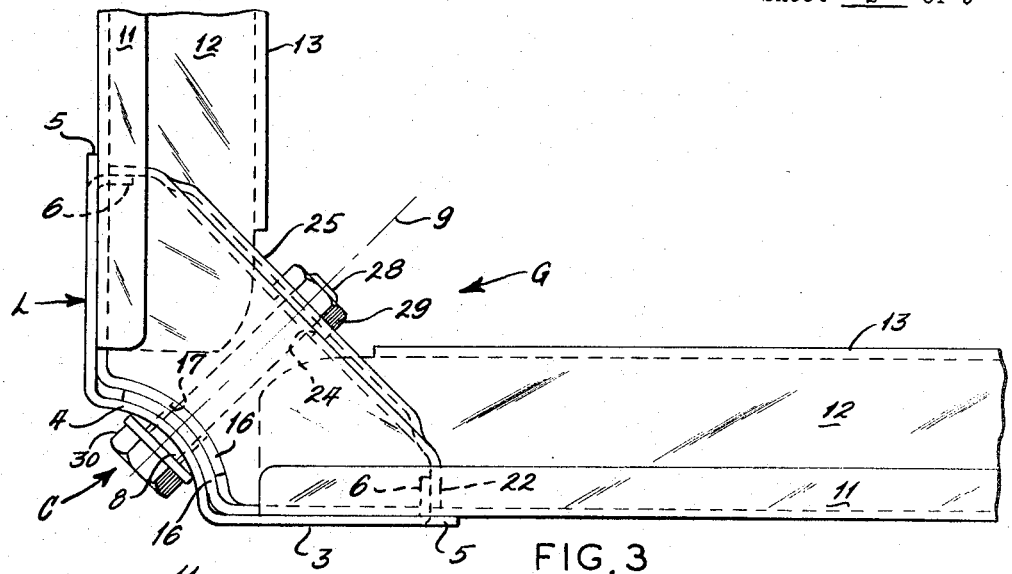
Figure 4:
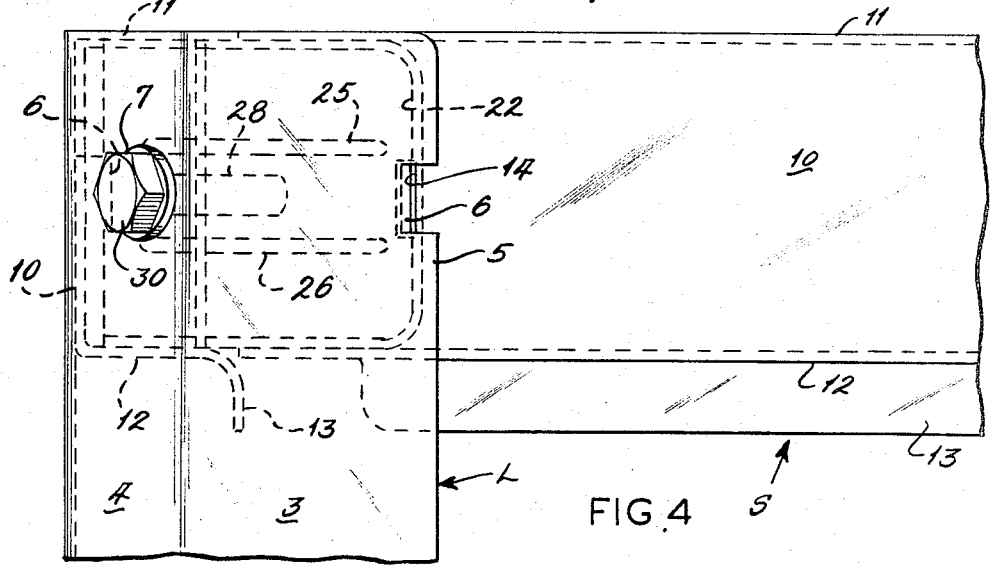
Figure 5:
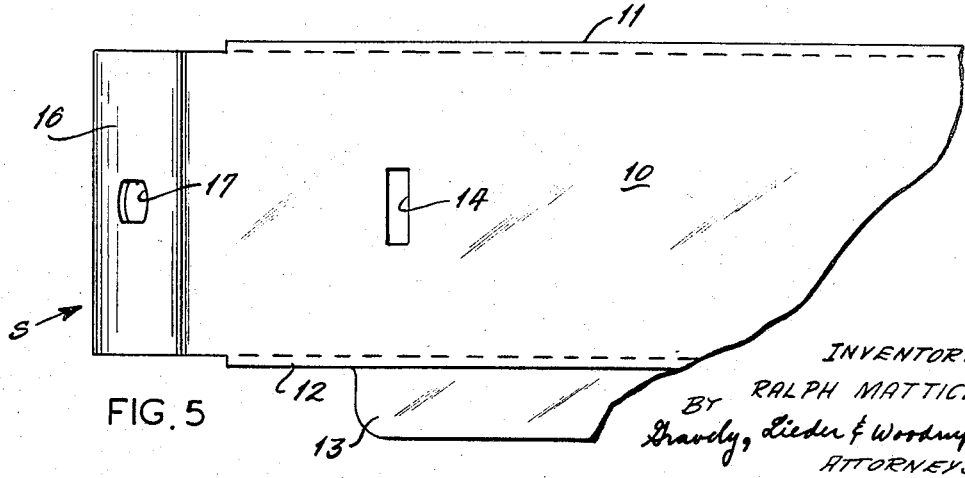
Figure 8:
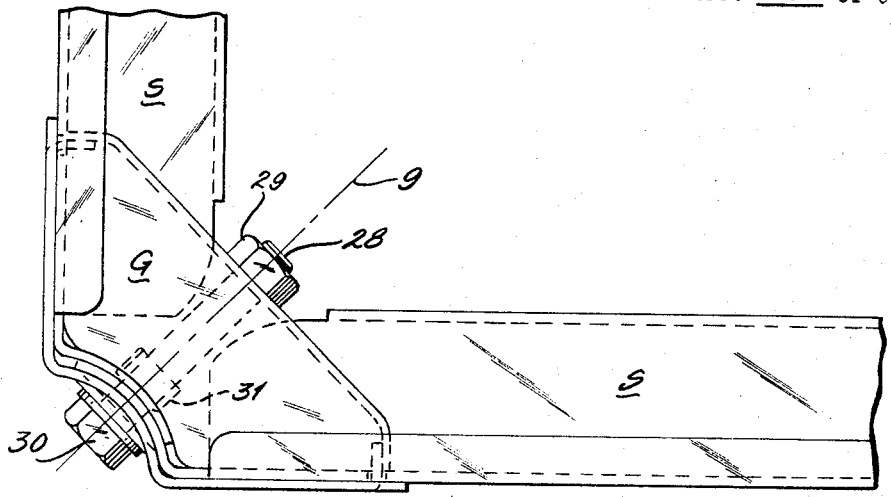
Figure 10:
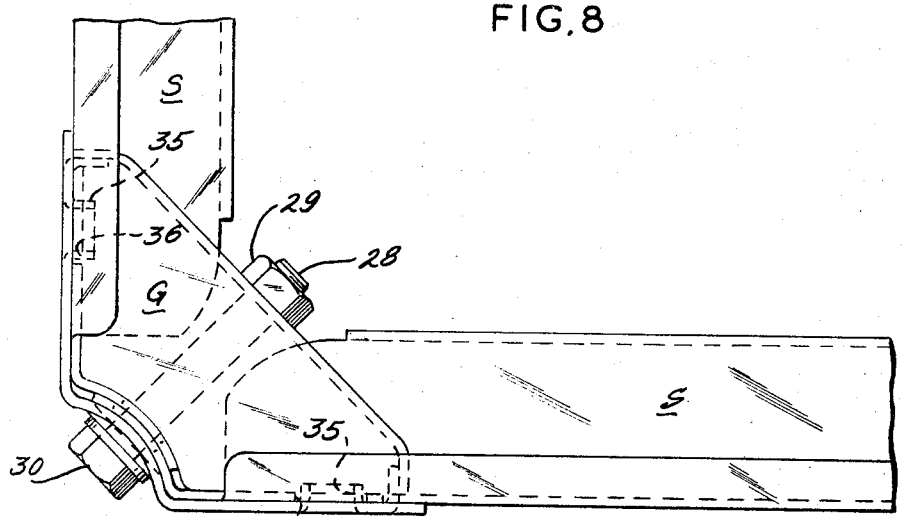
Figure 11:
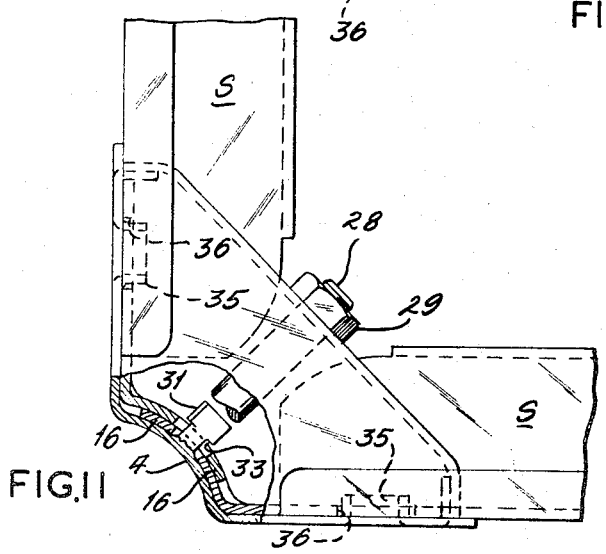
Figure 9:
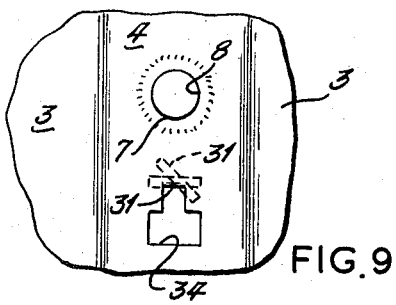
Figure 16:
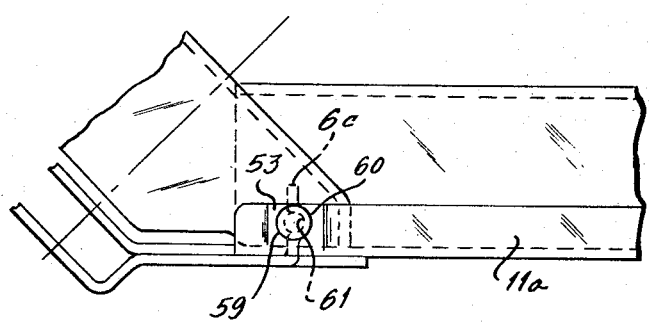
Figure 14:
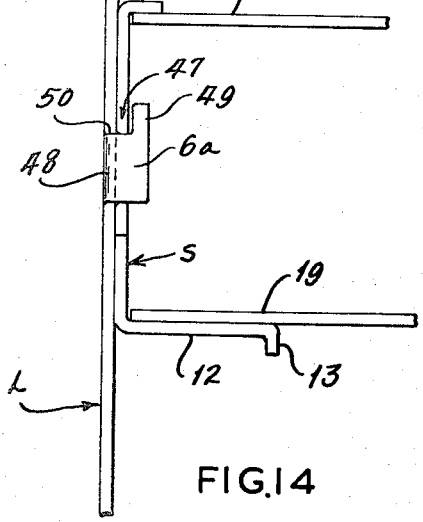
Figure 17:
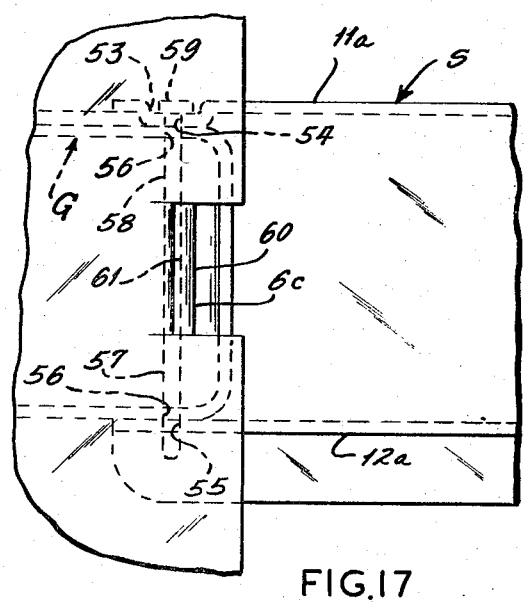
Figure 15:
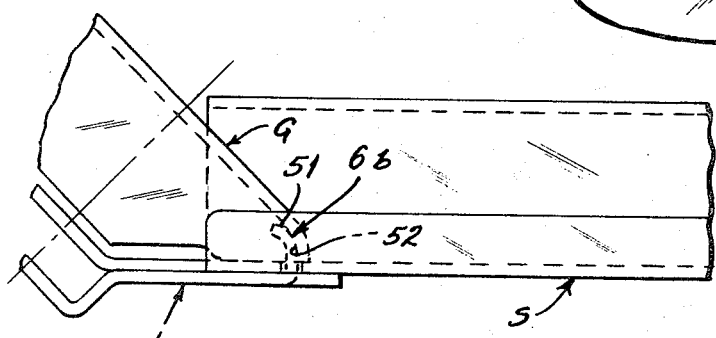

The invention also consists in the parts and in the arrangements and combinations of parts hereinafter described and claimed. In the accompanying drawings which form part of this specification and wherein like numerals and symbols refer to like parts wherever they occur:

FIG. 1 is a perspective view of a table embodying the present invention, the table top having been removed to make the corner construction more clearly visible, FIG. 2 is an enlarged perspective looking upwardly toward the inner side of a corner, FIG. 3 is a top plan view of said corner, FIG. 4 is a side view thereof, FIG. 5 is a fragmentary side view of a side member, FIG. 6 is a top plan view of the corner gusset, FIG. 7 is a side view of the inside of the corner gusset, FIG. 8 is a top plan view showing a modification of the present invention, FIG. 9 is a view looking directly at the central portion of the leg, FIG. 10 is a top plan view of a further modification of the present invention, FIG. 11 is a top plan view, partly in section, of a further modification of the present invention, FIG. 12 is a top plan view of a still further modification of the present invention, FIG. 13 is a side elevational view of the modified form shown in FIG. 12 showing the use of two bolts to secure the lower leg to the upper leg instead of the four bolts previously required, FIGS. 14 and 15 show two different ways to modify the tabs to prevent the table from falling should the bolt break or become disassembled, and FIGS. 16 and 17 are fragmentary top plan and side views, respectively, of still another way to prevent the table from falling should the bolt break or become disassembled.

Referring now to the drawings in detail, it will be seen that the embodiment of the invention which has been illustrated comprises a corner C for a heavy duty table T. The table T is shown in FIG. 1 without a table top or work surface so that the corner C can be illustrated more clearly.

The table T has four upright legs L connected by side members S, such as upper side members 1 and lower side members 2, which may be identical to each other. That is, if a square table T is desired, each of the eight side members S may be identical. Obviously, if a rectangular table T is desired, four of the side members S will be shorter than the other four. Each leg L has two side flanges 3 perpendicular to each other and connected by a curved central portion 4. The outer edge portion of each flange 5 of each leg L has an inwardly bent tab 6 thereon at the position where the leg L receives an upper side member 1 or a lower side member 2. The curved central portion 4 is provided with a boss 7 with a hole 8 therein whose axis 9 is 45° from the plane of each flange 3 of the leg L. The hole 8 is substantially at the same vertical height as the tabs 6.

For simplicity and ease of manufacture and assembling, each side member 1 has an upstanding portion 10, a top flange 11, a wider lower flange 12 with a depending flange 13 on its lower edge portion. The upstanding portion 10 is provided with a rectangular opening 14 inwardly of each end 15 and a curved connector 16 with a hole 17 therein.

The corner gusset G, FIGS. 6 and 7, has a horizontal top portion 18 and bottom portion 19 with an upstanding wall 20 therebetween. The wall 20 has an oblique central portion 21 with two end portions 22 at 45° thereto. The end portions 22 are dimensioned to receive the tabs 6 along their inner surfaces 23 and are longer than said tabs 6. The central wall 21 is provided with a hole 24 and two parallel ribs 25 and 26 above and below said hole 24. The gusset G has a curved corner 27 which contacts the curved ends 15 of the side members S. One corner gusset G is required for each of the four upper corners C, and one corner gusset G is required for each of the lower corner constructions.

The assembled corner is best shown in FIGS. 1–4 in which the corner gusset G is shown bracing the side members S against the leg L in tight relation by reason of a bolt 28 and nut 29. The bolt is inserted through the hole 8 in the leg L, the holes 17 in the two side members S, and the hole 24 in the corner gusset G. The nut 29 is placed between the horizontal ribs 25 and 26, and the bolt 28 screwed into it by hand until a wrench or tool is required. The head 30 of the bolt 28 is rotated which causes the bolt 28 to be tightened thereby flexing the side flanges 3 of the legs L slightly outwardly to force the tabs 6 into tight contacting relation with the end wall portions 22 of the corner gusset G. The top portion 18 and bottom portion 19 of the corner gusset G are spaced so that they contact the inner surfaces of the top flange 11 and lower flange 12 of the side members S. Thus, a rigid corner construction C is formed upon tightening of one bolt 28.

It will be seen that the table T requires only eight diagonally extending bolts 28, whereas in prior constructions four bolts were required at each corner so that a total of thirty-two bolts was necessary. These were hard to assemble and did not provide as sturdy a corner construction as the present invention.

The curved connector 16 at one end of the side member S has a larger radius of curvature than the curved connector 16 at its other end, so that the two curved ends 16 of adjacent members will lie in contacting relation along their entire curved surfaces, as shown in FIG. 3. With material about .075″ thick, the radius at one end may be ⁵³⁄₆₄″ and at the other end ⁵⁵⁄₆₄″. This makes a good fit and no stress is needed from the bolt 28 to bend the curved ends or connectors 16 of adjacent contacting side members S against each other.

It is believed that the assembly of the table T from the legs L, side members S and corner gussets G with one bolt 28 is clear from the drawings. The bolt 28 and the two tabs 6 provide three places of support between the legs L and the side members S. The tabs 6 are of such height as to completely fill the vertical height of the openings 14 in the side members S, thereby forming a rigid corner construction C.

Referring now to FIGS. 8–11, it will be seen that the modification shown in FIGS. 8 and 9 is the same as in FIGS. 1–7 but also includes a tongue 31 struck from the central portion 4 of the leg L below the hole 8, which tongue 31 fits into openings 32 below the bolt openings 17 in the curved connectors 16 of the side members S. The tongue 31 has shoulders 33 thereon which contact the inner surface of the connector 16 when the tongue 31 is twisted slightly as shown in FIG. 9. The tongue 31 has the same shape as the opening 34 from which it is struck.

In the modification shown in FIG. 10, in addition to the diagonally extending bolt 28, and the tabs 6, the side flanges 3 of the legs L are each provided with circular collars 35 struck from the metal in the flanges 3 which fit into circular holes 36 adjacent to the rectangular openings 14 in the side members S. In the modification shown in FIG. 11, both additional means shown in FIGS. 8 and 10 are used to rigidify the corner C. The modifications shown in FIGS. 8–11 help rigidify the corner, but are not required.

It is believed that the assembly of the various parts into assembled relation is obvious from the foregoing description and drawings.

This invention is intended to cover all changes and modifications of the example of the invention herein chosen for purposes of the disclosure, which do not constitute departures from the spirit and scope of the invention.

The projections or beads 25 and 26 strengthen the gusset G. When they are horizontal, as shown, they can be used to prevent rotation of a four-sided or six-sided nut 29. However, such beads 25 and 26 may be vertically positioned, or may be positioned on the inside of the oblique wall 21 instead of on the outside as shown. The beads 25 and 26 should be on the inside when a carriage bolt is used, because a carriage bolt cannot be rotated and the nut must be free to rotate on the threaded end thereof.

The present invention is also embodied in an adjustable leg construction, wherein the height of a leg L can be changed on a heavy duty table by the use of two bolts instead of four bolts as required in the past. This adjustable leg construction is shown in FIGS. 12 and 13 wherein each modified leg L has an upper leg portion 37 which receives modified upper and lower side members 1a and 2a, and a lower leg portion 38 which rests on the floor or a supporting surface. Each leg portion 37 and 38 has a plurality of vertically spaced holes 39 in its central portion 4a. The holes 39 may be oval if regular bolts 28 are used with a nut 29 on the opposite threaded end which is positioned between the upper and lower horizontal ribs 25 and 26 on the gusset G. If preferred, the holes 39 may be rectangular, as shown in FIG. 13, so as to receive the square shank of a so-called carriage bolt. If a carriage bolt is used, the projections or beads 25 and 26 should be on the inner surface of the oblique wall 21 of the gusset G so that the carriage bolt can be tightened by rotating the nut 29. A carriage bolt has a flat or square shank extending inwardly about ⁵⁄₃₂ of an inch from its head so that the carriage bolt itself cannot be rotated within the square hole 39.

FIG. 12 shows a top plan view in which the side members 2a have connectors 16a. Each connector 16a has a straight central portion 40 positioned 45° to the plane of the side member 2a to which it is connected and an extension 41 positioned 90° thereto. One of the side members 2a has an offset portion 42 to move the connector 16a inwardly a distance equal to the thickness of a connector 16a on the adjacent side member 2a. In the form shown in FIG. 12, the upper leg portion 37 has a central channel portion 4a having an outer flat portion 43 with two inwardly extending flanges 44 which connect with the side flanges 3a of the upper leg portion 37. The channel portion 4a forms a channel or boss or guide which is received in a similarly shaped central channel portion 4b of the lower leg portion 38. The central channel portion 4b of the lower leg portion 38 has an outer flat portion 45 with two inwardly extending flanges 46 which connect with the two side flanges 3b. The channel portion 4a of the upper leg 37 is received in the channel portion 4b of the lower leg 38 in sliding relation so that the two portions 37 and 38 can slide vertically with respect to each other but cannot twist or move laterally. The registering channels 4a and 4b prevent twisting of the upper and lower leg portions 37 and 38 with respect to each other. Therefore, only two bolts are required to secure the leg portions together, whereas in the past it has been common to use four bolts to provide vertically adjustable leg portions, as shown in FIG. 1. The side flanges 3b of the lower leg 38 are at a slight angle to the side flanges 3a of the upper leg 37 (FIG. 12) and tend to assume a more parallel relation when the bolt 28 and nut 29 are tightened. As tightening occurs, the flanges 46 are free to move inwardly along the flanges 44 until the outer flat portion 45 contacts the flat portion 43 on the inner leg 37.

With the two bolt adjustable leg shown in FIGS. 12 and 13, the upper bolt 30 may extend through a gusset G if desired, in which event the lower bolt 30a (FIG. 13) may have a washer or separate member shaped like a connector 16a on the inside of the upper leg 37 to assist in holding the leg members 37 and 38 together in tight rigid assembled relation.

FIGS. 14–17 show three different ways to prevent the tab 6 from coming out of the opening 14 in the side member S should the bolt 28 come out of its normal assembled position or should the bolt 28 break. In that event, the table might become disassembled with the leg L falling from the side members S.

FIG 14 shows a tab 6a with a cut-out portion 47 adjacent to the hinge line 48 of the tab 6a and an upstanding projection 49. The cut-out portion 47 is at least as wide as the combined thicknesses of the leg L and the side member S. The opening 14 in the side member S is the same size as shown in the form shown in FIG. 5, so that the tab 6a can be inserted therein, after which the leg L is moved up or the side member S is moved down so that side member S rests on the horizontal ledge 50 of the cut-out portion 47.

FIG. 15 shows a tab 6b which is initially straight like the tab 6 (FIG. 2) but which curves when the corner construction is tightened so that its outer curved surface 51 so formed lies adjacent to the inner curved surface 52 of a modified gusset G. The curvature of the modified tab 6b prevents the leg L from being readily removed from the side members S even if the bolt 28 becomes disassembled or breaks.

FIGS. 16 and 17 show a side member S whose top flange 11a has a depression 53 therein with a hole 54 therein in vertical alignment with a hole 55 in the lower flange 12a and holes 56 in the gusset G. The holes 54, 55, and 56 are adapted to receive a pin 57 whose vertical shank 58 extends through the holes 54, 55, and 56 and whose upper head 59 is positioned within the depression 53. In this form, the tab 6c has a curved portion 50 which forms a socket 61 for receiving the pin 57, so that the tab 6c cannot be withdrawn from the opening 14 in in the side member S without first removing the pin 57.

What is claimed is:

1. A corner construction for a table, said table having an upright leg with flanges thereon, said leg receiving two side members, each of said flanges having an inwardly bent tab received in an opening in a side member, a corner gusset extending between said side members and having an oblique wall, said corner gusset receiving a bolt and a nut, said oblique wall having small angular end walls in contact with said side members, each of said side members having an opening therein for receiving one of said tabs and having a connector with an opening for receiving said bolt, said leg having a central portion between said flanges, said central portion having an opening therein, said opening being in line with the openings in said connectors of said side members and said corner gusset, said tabs extending through said openings in said side members and being in contacting relation with said end walls of said corner gusset.

2. The corner construction set forth in claim 1 wherein said bolt has a head and extends inwardly from said central portion of said leg to and through said oblique wall of said corner gusset, said bolt head remaining outwardly of said leg.

3. The corner construction set forth in claim 1 wherein said oblique wall on said corner gusset is provided with two projections, one spaced on either side of said bolt hole.

4. The corner construction set forth in claim 1 wherein said tabs in said flanges are substantially the same vertical height as the rectangular openings in said side members into which said tabs fit and wherein said corner gusset has a top and bottom flange which fit between and in contacting relation with top and lower flanges on said side members.

5. The corner construction set forth in claim 1 wherein tightening said diagonally extending bolt pivots the flanges slightly and causes the tabs on said flanges to contact the end wall portions of the corner gusset in tight contacting relation to provide a wedging effect.

6. The corner construction set forth in claim 1 wherein tightening said diagonally extending bolt pulls the end wall portions of the corner gusset in perpendicular and tight contacting relation with the inner surface of the upstanding portions of said side members.

7. The corner construction set forth in claim 1 wherein the leg is provided with a curved central portion having a boss for receiving the inner edge of the bolt head.

8. The corner construction set forth in claim 1 wherein said central portion has a tongue struck therefrom extending into a registering opening in each of the overlapping connectors on the side members, said tongue having a shoulder thereon and being twisted after being inserted in said opening so that said shoulder contacts the inner surface of the connector.

9. The corner construction set forth in claim 1 wherein each of the side flanges of the leg is provided with a collar struck from the metal in close proximity to said tab, said collar adapted to be received in circular openings in the side members.

10. The corner construction set forth in claim 1 wherein said central portion has a tongue struck therefrom extending into a registering opening in each of the overlapping connectors on the side members and wherein each of the side flanges of the leg is provided with a collar struck from the metal in close proximity to said tab, said collar adapted to be received in circular openings in the side members, said tongue having a shoulder thereon and being twisted after being inserted in said opening so that said shoulder contacts the inner surface of the connector.

11. The corner construction set forth in claim 1 wherein said tabs have a cut-out portion and an upstanding projection thereon for preventing the side member from becoming accidentally separated from the upright leg.

12. The corner construction set forth in claim 1 wherein said tabs are initially straight and the end walls of said corner gusset are curved so that upon tightening said construction said tabs become curved and lie in contacting relation with said curved end walls of said corner gusset, said curved tabs making it more difficult to separate said leg from said side members than if said tab were straight.

13. The corner construction set forth in claim 1 wherein said side members and said corner gusset have aligned holes for receiving a vertically extending pin, said tabs having a curved portion forming a socket therein for receiving said pin, thereby preventing said side member from becoming accidentally separated from the upright leg.

14. The corner construction set forth in claim 13 wherein a top flange of the side member is provided with a depression for receiving a head on the pin, the top surfaces of said head and said top flange being flush.

References Cited

UNITED STATES PATENTS

| | | | |
|---|---|---|---|
| 2,143,542 | 1/1939 | Clarin | 248—188 |
| 2,172,687 | 9/1939 | Anderson et al. | 248—188 |
| 2,224,558 | 12/1940 | Vincent | 248—188.8 |
| 2,873,035 | 2/1959 | Unis | 248—188 |
| 3,187,693 | 6/1965 | Hamilton | 248—188 |
| 3,204,905 | 9/1965 | Marban | 248—188 |
| 3,229,790 | 1/1966 | Shayne | 108—111 |
| 3,255,722 | 6/1966 | Ferdinand et al. | 108—107 |
| 3,327,658 | 6/1967 | Schreyer | 248—188 |
| 3,341,160 | 9/1967 | Jones | 108—156 |

FRANCIS K. ZUGEL, *Primary Examiner.*

U.S. Cl. XR.

108—156